United States Patent Office 3,521,355
Patented July 21, 1970

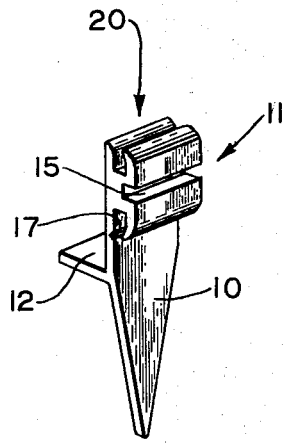
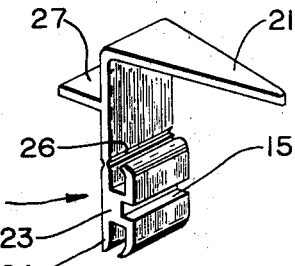
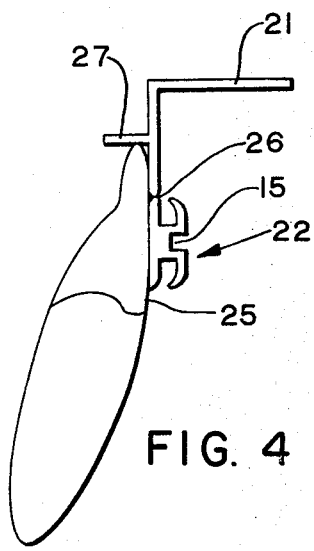
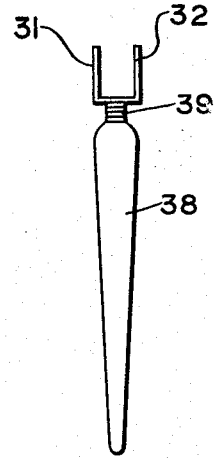
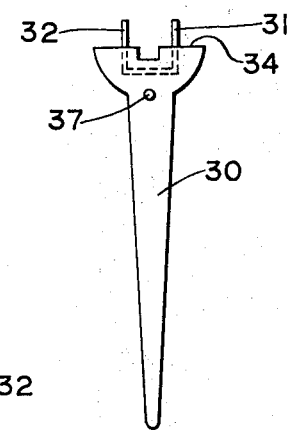
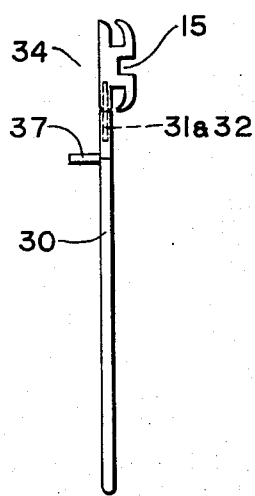
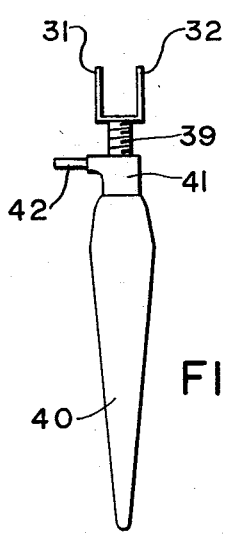

3,521,355
POSITIONING MEANS FOR ORTHODONTIC BRACKETS
Lawrence Pearlman, 231 East St.,
Sharon, Mass. 02067
Continuation-in-part of application Ser. No. 579,321,
Sept. 14, 1966. This application June 30, 1969, Ser.
No. 837,735
Int. Cl. A61c 7/00
U.S. Cl. 32—14                                                                13 Claims

ABSTRACT OF THE DISCLOSURE

An orthodontic positioning means has a handle for use in association with an orthodontic bracket to correctly position the bracket on the labial surface of a tooth. The handle carries means for supporting an orthodontic bracket and means for permitting measurement of the position of the bracket on the tooth. The handle can be integrally molded with the bracket or can be releasably interlocked therewith and in both cases, can be easily removed from the bracket after handling and positioning on a tooth.

RELATED APPLICATION

This application is a continuation-in-part of applicant's copending patent application filed Sept. 14, 1966 Ser. No. 579,321 entitled Orthodontic Device now U.S. Pat. No. 3,469,314 issued Sept. 30, 1969.

BACKGROUND OF THE INVENTION

In recent years it has been proposed to attach individual plastic brackets directly to individual teeth for use in common orthodontic procedures. Many such brackets have been proposed including molded plastic brackets and multipart brackets which allow interchangeability of bracket constructions as more fully described in the above-noted parent application. Difficulties sometimes arise in positioning such brackets on the teeth due to their inherent small size and the preciseness of positioning required.

It is an object of this invention to provide a handle for use in positioning orthodontic brackets on teeth rapidly and efficiently.

Another object of this invention is to provide a handle in accordance with the preceding object which incorporates a positive measuring means to aid in precise positioning of the bracket.

Still another object of this invention is to provide a handle in accordance with the preceding objects which is formed integrally with a bracket and can be separated therefrom after use.

SUMMARY OF THE INVENTION

An orthodontic handle is provided for use in association with an orthodontic bracket to correctly position the bracket on the labial surface of a tooth. The handle comprises means for supporting an orthodontic bracket to enable positioning of the bracket on the tooth and means for measuring the position of the bracket on the tooth prior to affixing the bracket on the tooth as by conventional adhesive means.

In the preferred embodiment, the orthodontic bracket and handle are integrally molded of a plastic material with means being provided to enable ease of breaking the handle from the bracket once the bracket has been mounted on the tooth.

In another embodiment of this invention, the handle carries a releasable interlocking projection and the orthodontic bracket defines a receiver means for receiving the projection whereupon the bracket can be positioned and adhered in place after which the handle is separated from the bracket by withdrawal of the projection preferably along with the handle. In this embodiment, the handle preferably carries a measuring gauge or a measuring device which can be adjustable.

It is a feature of this invention that rapid and efficient positioning of the brackets can be made on the labial surface of teeth within the mouth. The bracket handles can easily be removed. In the case of the non-integral handles, brackets can easily be mounted on the handle and a single handle used to position a series of brackets. Moreover, the handles of this invention can be used with a wide variety of tooth brackets.

BRIEF DESCRIPTION OF THE DRAWINGS

The above and other objects, features and advantages of the present invention will be better understood from the following specification when read in conjunction with the accompanying drawings in which:

FIG. 1 is a perspective view of an orthodontic attachment or bracket assembly carrying a bracket molded integrally with a handle in accordance with the present invention;

FIG. 2 is a side view of the bracket shown in FIG. 1 in juxtaposition to an upper tooth to which the attachment is to be applied;

FIG. 3 is a perspective view of an attachment similar to that shown in FIG. 1, but designed for application to a lower tooth;

FIG. 4 is a side view showing the attachment of FIG. 3 positioned on a tooth;

FIG. 5 is a front view of an alternate embodiment of a handle of this invention;

FIG. 6 is a bottom view of a bracket constructed for use with the handle of FIG. 5;

FIG. 7 is a side view of the handle of FIG. 5 with the releasably attached bracket of FIG. 6 mounted thereon;

FIG. 8 is another alternate embodiment thereof; and

FIG. 9 is still another alternate embodiment thereof.

BRIEF DESCRIPTION OF PREFERRED EMBODIMENTS

With reference now to the drawings, a preferred embodiment of an orthodontic handle is shown in FIGS. 1 and 2 where an elongated handle 10 is integrally attached to a bracket 11 in a molded one-piece plastic unit. The handle 10 is preferably flat as shown and is integrally molded with the bracket which may be of any conventional shape and form. Plastics are preferred for use since they permit ease of snapping the bracket from the handle and also since they can be colored to match the color of the tooth with which they are used to improve the esthetic appearance of the orthodontic bracket. An integral gauge 12 preferably in the form of a planar flat shelf, extends outwardly from the rear of the handle 10 preferably at a right angle to the plane of the handle.

The bracket 11 shown has a base 18, an upward extension, a transverse groove and upwardly and downwardly extending slightly overturned wings for attachment of ligating wires. Such brackets are known in the art for use directly on individual teeth. The brackets can be attached by conventional adhesives to the teeth. Preferably the brackets have a curved rear surface 13 adapted to conform to the shape of the tooth on which they are to be mounted. In some cases, the brackets of this invention can be made of a softer plastic material so as to be capable of yielding to pressure to conform to the shape of the teeth. The rear surface 13 may be knurled or roughened to improve adhesive connection with the teeth. Preferably the brackets are formed of methyl methacrylate which is resistant to normal conditions found in the mouth of a user. As shown in the preferred embodiment of FIG. 2, the bracket mounting surface 13 conforms to the contour of the labial surface 14 of the tooth on which it is to be mounted.

The gauge 12 is set a preselected distance below the channel 15 which distance is a precise incisal measurement for the particular tooth to which the attachment is to be applied. The particular bracket assembly with handle and gauge can be made in a series of sizes to accommodate standard sizes required for different teeth on which the integral handle and bracket are to be used.

The lower edge 16 of the bracket 11 can be separated from the handle 10 by a weakened or scored line or groove 17, preferably on both opposing surfaces of the handle, to enable the handle 10 to be broken from the bracket after the bracket has been mounted in place on the labial surface of a tooth and adhered in place. In FIG. 2, the line 17 is shown to be defined by a V-shaped groove cut in the upper surface of the attachment so that when the handle is broken from the bracket, the base 18 of the bracket merges smoothly into the surface of the tooth. Similarly, a bevelled edge 20 is shown in FIG. 2 along the upper margin of the base 18 so that a sharp line is formed by the merging of the base 18 onto the tooth surface. The sides of the base may also be bevelled.

The embodiment of FIGS. 1 and 2 is suitable for application to upper teeth of the mouth; however, the handle 10 might well interfere with the mounting of a similar bracket on lower teeth. Therefore, in accordance with the embodiment of FIGS. 3 and 4, a handle and integral bracket is provided for use on the lower teeth. A handle 21 is provided with a right angle bend which extends substantially perpendicular to the plane of the bracket base 23. As shown in FIG. 3, the bracket 22 which is identical to bracket 11 is provided with a base 23 having a curved rear surface 24 designed to conform to the curvature of the labial surface 25 of the tooth upon which it is to be mounted. The handle 21 extends upwardly a short distance from the upper edge 26 of the bracket and then extends in a forward direction. The gauge 27 extends inwardly from the rear edge of the handle 21 above the line 26, and like the embodiments of FIGS. 1 and 2, the distance between the gauge 27 and the slot 15 is a precise measurement determined by the size of the particular tooth upon which the bracket is to be mounted. While the gauge is shown as a flat shelf, it can be in the form of a pin or other projection extending inwardly from the rear edge of the handle.

Tests have revealed that the incisal bracket measurements most commonly used are between 3 and 5½ millimeters. It is evident that a range of bracket sizes can be made available to eliminate much of the technical work in adapting and positioning brackets on the teeth. At the present time, the positioning of brackets on the teeth is a particularly time consuming operation because the orthodontic bands and their attachments have to be shifted very precisely and measurements must be taken to achieve the desired mounting position. In use, the embodiments of FIGS. 1-4 are adhered to the appropriate teeth with the gauges engaging the incisal edge of the particular tooth involved. After the bracket is anchored, the handle is removed by breaking along the weakened line or groove such as 17. The horizontal bar 21 of the handle does not interfere with movement of the upper teeth.

Turning now to an alternate embodiment of the invention as illustrated in FIGS. 5, 6 and 7, a non-integral handle 30 is shown which carries means for releasably interlocking a set of parallel projections 31 and 32 with a conventional orthodontic bracket 33 which bracket defines a receiver for receiving the projections to support the bracket during use. The handle 30 is generally in the form shown for handle 10 but carries at its upper portion an embedded C-shaped thin wire having two outwardly extending prongs 31 and 32 and a preferably flat upper surface 34. The bracket 33 is provided with corresponding bores 35 and 36 positioned in registration with the prongs 31 and 32. A measuring gauge 37 is formed by a pin or circular extension mounted in the handle and located at the precise incisal position desired for mounting on a particular type of tooth.

In use of the embodiments of FIGS. 5-7, as best shown in FIG. 7, the wire prongs 31 and 32 are positioned within the bores 35 and 36 and support the bracket 33 as shown in FIG. 7. The bracket can then be adhesively secured to a tooth after which the handle is removed by withdrawal of the prongs.

The handle 30 can be provided with a measuring gauge of the same type as that shown in FIGS. 1–4 or with other measuring gauge devices. The particular form of brackets 33 used can vary greatly but in all cases defines means such as bores 35 and 36 for receiving the prongs of projections of the handle. One or more projections such as 31 and 32 can be used. The particular materials of the handle 30 and the bracket 33 can vary greatly as discussed above with relation to the embodiments of FIGS. 1–4. While wire prongs are preferably used as the releasable engagement means between the bracket and handle, plastic or other projections can be used.

FIG. 8 illustrates still another embodiment of the present invention where a handle 38 is generally similar to handle 30 but defines a reduced diameter cylindrical neck portion 32 having millimeter measuring lines denoted thereon. At the top of the neck portion 32, is located the wire projections 31 and 32 for use in connection with mounting brackets such as 33. The wire projections 31 and 32 are formed of a C-shaped wire as previously described adhered directly to the top of the neck portion or embedded therein as desired. In this embodiment, a shelf or projecting gauge can also be employed if desired although in some cases visual measurement can be solely used as a means for mounting the bracket in the proper position on a tooth.

In the embodiment of FIG. 9, the handle 40 is generally identical to the handle 31 except that the neck portion is provided with a threaded groove 39. On the threaded groove is mounted a collar 41 having outwardly extending gauge extension 42. The collar 41 is internally threaded so that it can be moved along the axis of the neck portion 41 by rotation thereof into desired positions making the handle useful for teeth having different incisal measurements as desired.

From the foregoing description, those skilled in the art will appreciate that the present invention provides a number of different embodiments of orthodontic handles useful for mounting brackets on teeth. Many variations are possible within the scope of this invention and include various shapes for the handles and brackets as well as alternate releasable interconnection means between the handles and brackets.

What is claimed is:

1. An orthodontic handle for use in association with an orthodontic bracket to correctly position said bracket on the labial surface of a tooth,
    said handle comprising means for supporting an orthodontic bracket to enable positioning of the bracket on the tooth,
    and means for measuring the positioning of said bracket on said tooth.

2. An orthodontic handle in accordance with claim 1 in combination with said orthodontic bracket wherein said handle defines a releasable interlock projection,
    and said orthodontic bracket defines a receiver means for receiving said projection whereupon said bracket can be positioned on a tooth and said handle later withdrawn.

3. The combination of claim 2 wherein said handle defines two parallel wire projections extending therefrom and said receiver means comprises two elongated bores adapted to snugly receive said projections.

4. The combination of claim 1 wherein said means for measuring comprises an indicator means on said handle.

5. The combination of claim 2 wherein said means for measuring comprises an adjustable gauge device mounted for movement axially of said handle.

6. An orthodontic bracket and integral handle for use in association with a tooth by adhesively securing said bracket to the labial surface of said tooth, said handle extending from said bracket and carrying gauge means thereon for properly positioning said bracket, and means for permitting separation of said handle and gauge means from said bracket when said bracket is positioned on a tooth.

7. An orthodontic bracket and integral handle in accordance with claim 6 wherein said bracket is formed of a tooth-colored plastic material.

8. An orthodontic bracket for use in association with a tooth by adhesively securing said bracket to the labial surface of said tooth, said bracket comprising a base having a surface dimensioned to engage the labial surface of said tooth, means on said base extending outwardly of said base for engaging tying wires, handle means extending from said base, gauge means mounted on said handle for use in accurately positioning said bracket on a tooth, and means for permitting separation of said handle means and gauge means from said base when said bracket is positioned on a tooth.

9. An orthodontic bracket in accordance with claim 8 wherein said bracket comprises an integral tooth-colored plastic material.

10. An orthodontic bracket in accordance with claim 9 wherein said handle comprises an extension of said base lying substantially in the same plane as said base.

11. An orthodontic bracket in accordance with claim 9 wherein a portion of said handle extends outwardly of the plane of said base.

12. An orthodontic bracket in accordance with claim 9 wherein said gauge means comprises an extension lying substantially in a plane set substantially at a right angle to a plane passing through said base surface.

13. An orthodontic bracket in accordance with claim 12 wherein said base carries a bracket body having outwardly extending flanges separated by means defining a channel.

References Cited
UNITED STATES PATENTS

| | | | |
|---|---|---|---|
| 2,527,526 | 10/1950 | Brusse | 32—14 |
| 3,303,565 | 2/1967 | Newman | 32—14 |

ROBERT PESHOCK, Primary Examiner